US012620836B2

(12) United States Patent
Alpert et al.

(10) Patent No.: US 12,620,836 B2
(45) Date of Patent: May 5, 2026

(54) TWO-WAY SECURE INTERFACE FOR AN OPTICAL WIRELESS POWER SYSTEM

(71) Applicant: Wi-Charge Ltd., Rehovot (IL)

(72) Inventors: Ortal Alpert, Ness Ziona (IL); Yoav Biderman, Tel Aviv (IL); Ran Sagi, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 885 days.

(21) Appl. No.: 17/766,320

(22) PCT Filed: Oct. 4, 2020

(86) PCT No.: PCT/IL2020/051076
§ 371 (c)(1),
(2) Date: Apr. 4, 2022

(87) PCT Pub. No.: WO2021/064735
PCT Pub. Date: Apr. 8, 2021

(65) Prior Publication Data
US 2024/0055903 A1 Feb. 15, 2024

Related U.S. Application Data

(60) Provisional application No. 62/910,581, filed on Oct. 4, 2019.

(51) Int. Cl.
*H02J 50/30* (2016.01)
*G06F 21/44* (2013.01)
(Continued)

(52) U.S. Cl.
CPC .............. *H02J 50/30* (2016.02); *G06F 21/44* (2013.01); *H02J 50/40* (2016.02); *H02J 50/80* (2016.02)

(58) Field of Classification Search
CPC .. H02J 50/30; H02J 50/40; H02J 50/80; H02J 7/00045; G06F 21/44; G06F 21/606; Y04S 40/20
See application file for complete search history.

(56) References Cited

U.S. PATENT DOCUMENTS

| | | | |
|---|---|---|---|
| 7,423,767 | B2 | 9/2008 | Steinsiek |
| 10,027,181 | B2 | 7/2018 | Fisher |
| | | (Continued) | |

FOREIGN PATENT DOCUMENTS

| | | |
|---|---|---|
| CN | 109474330 A | 3/2019 |
| KR | 20140101488 A | 8/2014 |

OTHER PUBLICATIONS

Extended European Search Report for EP Application No. 20872444.3, mail date Nov. 3, 2023, 8 pages.
(Continued)

*Primary Examiner* — Jeffrey M Shin
(74) *Attorney, Agent, or Firm* — Maine Cernota & Curran

(57) ABSTRACT

Methods and systems for enabling secure communication between a wireless charging system and at least one external device. The wireless charging system comprises at least one transmitter for supplying receiver(s) with wireless power. The external device may be used to control the wireless charging system by updating configuration files, instructing the transmitter as to which receiver to supply power to, and to supply billing information to enable receiver(s) to pay for wireless charging. The wireless charging system may provide the external device with data, such as receiver details, or images of the vicinity around the transmitter or receiver. The system only carries out the above if a key is presented to the wireless charging system. The key may be a physical key inserted into a component of the wireless charging
(Continued)

system, such as into the transmitter, or a numeric key received by the wireless charging system.

23 Claims, 3 Drawing Sheets

(51) Int. Cl.
  *H02J 50/40*          (2016.01)
  *H02J 50/80*          (2016.01)

(56)                    References Cited

U.S. PATENT DOCUMENTS

| | | | |
|---|---|---|---|
| 2004/0266367 | A1 | 12/2004 | Tuominen |
| 2016/0036594 | A1 | 2/2016 | Conrad |
| 2017/0077995 | A1 | 3/2017 | Leabman |
| 2017/0256980 | A1 | 9/2017 | Singh |
| 2017/0294809 | A1* | 10/2017 | Slepoy ..................... H02J 7/35 |
| 2018/0375340 | A1 | 12/2018 | Bell |
| 2019/0044393 | A1 | 2/2019 | Louis |
| 2019/0132056 | A1 | 5/2019 | Golan |

OTHER PUBLICATIONS

International Search Report and Written Opinion for PCT App. No. PCT/ IL2020/ 051076 mail date Jan. 7, 2021, 26 pages.
International Preliminary Report on Patentability for PCT App. No. PCT/IL2020/051076 mail date Apr. 14, 2022, 8 pages.

* cited by examiner

TWO-WAY SECURE INTERFACE FOR AN OPTICAL WIRELESS POWER SYSTEM

RELATED APPLICATIONS

This application is a national phase application filed under 35 USC § 371 of PCT Application No. PCT/IL2020/051076 with an International filing date of Oct. 4, 2020, which claims priority of U.S. provisional patent 62/910,581, with a filing date of Oct. 4, 2019. Each of these applications is herein incorporated by reference in its entirety for all purposes.

FIELD

The present disclosure describes technology related to the field of wireless charging, especially relating to the provision of a secure communication channel between a wireless charging unit and a device external to the wireless charging unit.

BACKGROUND

The need for wireless power transmission systems is generally accepted as a long-existing need, perhaps since the pioneering work of Nikola Tesla at the beginning of the twentieth century. Some such proposed wireless power systems are based on transmitting electromagnetic beams to photovoltaic cells or to antennae on a receiver, others are based on transmitting an ultrasound beam, or other types of power beams to the receivers.

Such suggested transmitting devices are referred to in this disclosure as "transmitters" and may use a laser beam, or another directed-power beam, to supply receivers with power. The "receivers" referred to in this disclosure typically refer to the unit which supplies the transmitted wireless power at its intended destination to the user of the power, typically a portable electronic device, or a device intended to be charged wirelessly, to obviate the need for battery replacement. Receivers are typically equipped with a photovoltaic cell to convert the beam received from the transmitter to usable electrical power, to enable charging or operating client devices without the need to plug the device into a physical socket. In such systems, the transmitter may identify the receiver by receiving from it a reflection of the transmitted beam, and/or receiving a wireless communication from it. Typically, the vicinity of a transmitter is scanned using either the electromagnetic beam emitted by the transmitter, typically on a low power setting, or using a separate light source, RF or ultrasound beam. Once a transmitter has located a receiver, the transmitter may use a scanning mirror or another beam aiming device, to direct its beam towards the identified receiver for charging. Such systems usually operate automatically, by identifying receivers which are within range of the transmitter and powering them.

Typically, a transmitter control unit associated with the transmitter is used to control both the scanning and the actual wireless charging. The transmitter control unit may be able to choose to which receivers to supply energy, to choose a power level of the beam, or to instruct the system to perform room scans. Such room scans can be used to detect receivers in the transmitter's field of view (FOV) or in that part of the FOV where the scan is performed. The transmitter control unit may generate an image of the surroundings of the transmitter and determine receiver locations.

In International Patent Application published as WO2009/ 083990, for "Wireless Laser Power Transmitter", having a common inventor and commonly owned by the present applicant, there is described a system in which a low power probe beam is used between transmitter and receiver to detect when a beam can safely be transmitted to a receiver, before enabling the beam power to be increased to its useful operating level.

The disclosures of each of the publications mentioned in this section and in other sections of the specification, are hereby incorporated by reference, each in its entirety.

SUMMARY

The present disclosure describes new exemplary systems for providing secure communication between a wireless charging unit and an external receiving device.

A secure communication channel between a remote external device or unit and a wireless power supply unit, otherwise referred to as a transmitter, allows for many advantages. For example, wireless charging units may contain software and/or firmware files that require periodic updates. Especially if more than one transmitter device is used in a wireless charging system, should the transmitter units be offline, updating multiple transmitter devices may necessitate a technician physically visiting each transmitter unit in order to update the configuration files. On the other hand, given that transmitter devices are in wired or wireless contact with an external control unit, the external unit may have the ability to simultaneously execute updates on multiple transmitter devices by simply sending a command to multiple transmitters.

Furthermore, a secure communication channel between a transmitter unit and an external device may allow for an external device to control one or more transmitters and/or transmitter control units and optionally coordinate between transmitter units. The external device may decide which receiver device should be charged by which transmitter device, and instruct the transmitter control units accordingly. Additionally, an external device may be supplied with the location of a receiver device, and thus instruct the transmitter control unit as to the direction and angle in which to aim the power beam so that it impinges on a receiver device. An external unit may additionally decide on the power level of the beam emitted by the transmitter.

In one implementation, before wireless power supply commences, a scan of the vicinity of the transmitter may be performed by either the transmitter unit or a camera or scanning device, in order to locate and identify receivers, such as is described in International Patent Publication WO/2019/224827 for "Wireless Power System with Identifiable Receivers", commonly owned by the present applicant. This may be performed by directing a low level laser beam to different directions and measuring the returning signal, or by otherwise scanning the room, to generate an image of the vicinity of the transmitter, or of the receiver(s). An external unit or device may be supplied with these images by the transmitter control unit, for location and identification of receiver devices. This advantageously may allow for a more lightweight transmitter control unit, as the transmitter device need not be required to perform complex tasks such as image recognition and identification.

The transmitter control unit associated with the transmitter may be similarly configured to communicate data to an external device, reply to queries, and supply external devices with information regarding operational parameters of the wireless charging system.

Additionally, a two-way communication system may give an external unit the ability to provide advanced monitoring and safety systems for the wireless power supply system. A wireless charging system may provide data to an external unit, such as log files, system information, and operational parameters of the system, and an external unit may use artificial intelligence and/or data analysts to analyze this information to alert the user to any unusual activity or behavior of the wireless charging system. The current system allows for protecting the system and its users from various risks, mainly involving safety, financial and privacy issues. External units may be used to alert users of indications of problems, monitor the system, and ensure that all safety features are working as required.

Furthermore, an external device or unit may enable the wireless charging system, and in particular the transmitter control unit, to access valuable data. Such data may include data available to home or business automation systems, to enable external systems to control the behavior of the wireless power system, to allow it to be updated, and to enable the use by external systems of data available to the wireless power system, such as billing date, client identification and power consumption and delivery. Some examples of communication are billing systems, which may be used for a receiver's owners to pay for wireless charging, and for transmitters to inform payment systems the amount of money receivers owe.

However, such provision of a channel of communication from a wireless charging system to an external device, and/or allowing devices external to the wireless power system to communicate with the wireless power system, may necessitate tight security measures.

Firstly, communication sent from the transmitter control unit to an external unit or device may include sensitive data, such as information regarding receiver devices. Thus an unsecured communication channel may make this information vulnerable to third party attackers, for example Man-in-the-Middle attacks or other snooping methods, or by a third party connecting to the transmitter and requesting the information.

Secondly, a third party gaining access to the transmitter control unit, for example through open ports or other channels or interfaces used to transmit or receive data and instructions, may cause the transmitter to behave in an abnormal and potentially unsafe manner. For these reasons the communication channel must be secure, typically authenticated, and protected.

Information provided by the wireless power system, in return to queries from external units, or information which the transmitter control unit is configured to provide on its own accord, may be valuable, since this data may have commercial applications. Furthermore, this data may be used to optimize the use of the system as well as to be a platform for commercial services.

The current disclosure thus presents a system in which an authentication key is used to allow for secure communication between an external device and a wireless charging unit. The authentication key may be in the form of a hardware key, a numeric key, or both.

A transmitter control unit, and/or a transmitter device, may be isolated from a wireless or wired network during regular, day-to-day use, or may have sensitive components that are isolated from a network, in order to ensure that unintended third parties do not gain access to the wireless charging device. Thus, in order for an authorized unit to communicate with the transmitter control unit, it may be necessary to temporarily create a communication channel between the two end points. In one implementation, a hardware key is used to close a switch directly, creating a communication channel between the transmitter control unit and the external device. Alternatively, a hardware key may be used to allow for such communication without physically creating the communication channel. For example, the control unit may check to ensure that a key is present or has been presented, before executing instructions or sending information to an external device. In the latter scenario, the transmitter may have a wired or wireless connection with external devices during day-to-day use, but certain communication is only allowed or available with the presentation of a hardware key, for example, the transmitter control unit may be in communication with one or more external devices during regular wireless charging, and only require a key when sensitive commands or communication is necessary. Examples of such a hardware key include a specially shaped tool, or alternatively, a conventional type of key.

Alternatively or additionally, a numeric key may be used in order to protect and secure communication between an authenticated external unit and the transmitter control unit. The numeric key may consist of letters, numbers, or digital representations of electric signals. The numeric key may be a hash or signature of a file.

In one embodiment, should an external unit instruct the transmitter control unit to execute an instruction, or amend or run a file in the system, the transmitter control unit may first check the numeric key, which may be a signature or hash of the received file, with a third party certification server, or with a database of verified signatures or hashes.

Alternatively or additionally, a numeric key may be an authentication code, such as a password or pin. When an instruction or data is received at the transmitter control unit, the transmitter control unit may determine whether the data contains the correct authentication code, and ignore or trigger an alert should specific commands be issued without the presence of the authentication code.

An external computer might send the transmitter control unit queries or commands, for example:

What model number is the transmitter?

List available receivers

What power supply capabilities does the transmitter have?

List available functions

Scan the vicinity of the transmitter

Perform a certain function

What is the temperature of the laser?

Send log files

An external computer might command the transmitter to turn on/off, to scan the vicinity of the transmitter, or to power a certain receiver.

There may be a user interface on a computer that shows how many receivers are in the vicinity, where they are, and who or whose they are. Information pertaining to receivers, such as an inventory of receivers generated by a transmitter control unit, may list the specific location of a receiver, which may be connected to a person's phone, which may be considered sensitive data collection.

Therefore, in order to prevent such unintended access, certain functions may be protected, for example by a password, or by an authentication exchange, prior to the exchange of such information or prior to granting access. An Application Programming Interface, hereinbelow referred to as an API, may be used to enable the exchange of information between a transmitter control unit or wireless charging unit and an external device. Information exchange using the above mentioned API may be encrypted to avoid third parties gaining access to information and issuing "verified" commands.

Authentication of the external unit may be performed by receiving a key, which may be in the form of a software key or hardware key, or by checking the identity of the external unit against an authenticated database. Authentication of the external unit may also be performed by it being physically connected to the transmitter unit, for example by using a wired connection.

The present system provides a protected interface that prevents an unauthorized user from gaining access to such private data, by ensuring that such data is only sent to authenticated units in a way that does not allow snooping by third parties.

In another embodiment of the current invention, upon receiving a request for information which is considered sensitive, or information that requires privacy protection, the transmitter control unit may first verify that the external unit is properly authenticated and eligible to receive such data. Then, only if the external unit is authenticated and/or eligible to receive such data, will the transmitter control unit send the information to the external unit. The data sent may be encrypted by the control unit or by another subsystem (such as the modem) prior to sending it.

Moreover, certain parameters, for example, parameters set at the manufacturing stage such as those relating to laser and power meter calibration, and the modification of safety systems, should not be easily modifiable without a security measure preventing unauthorized persons to modify them. Other such parameters may include identification information for eligible external systems, receivers, or the like. Such a security measure could include the use of a hardware token to gain access to these parameters, for example, a user having to insert a special hardware key into an external unit, to verify the user's integrity, before having access, be it remote or direct, to these sensitive elements of the system, or an internal connector in the system which may not be accessible without the use of a tool available only to authorized users.

When performing functions enabled by the use of an API protocol which may compromise system safety, the transmitter control unit typically first performs the following actions in order to ensure system safety:

It ensures that the laser is not lasing at dangerous power levels. Typically, laser power is set to zero, but a low laser power, such as within the limits of class 1 lasers, may also be an acceptable level.

If an operational file is received, for example, a new firmware, software, or calibration file, the transmitter control unit verifies the integrity of the file, for example by verifying an electronic signature on the file.

It verifies that the external unit is authorized and eligible to perform the demanded operation, for example, by requiring a password or another key.

Once the above actions have successfully completed, the control unit may perform the requested task.

Information shared external to the transmitter control unit, as further listed in the detailed description below, may contain privacy sensitive data, such as an image of the vicinity of the transmitter or receiver(s), which may be collected at the scanning phase or at a different phase, or information regarding receivers, and would in the current system, require a password/key to be used and/or agreed upon before performing such operations. Some privacy sensitive operations include an external unit performing any of the following actions:

Obtaining information regarding receiver devices, such as Receiver ID, if applicable Locations of receivers

Names and information regarding the owners of receiver devices

Obtaining logs from the transmitter control unit

Receiving information regarding the status of devices connected to the receiver, typically, battery status, temperature, serial numbers, identity, and the model of different devices Information pertaining to a scan of the vicinity of the transmitter or receiver(s), for example an image of the vicinity close to the transmitter Obtaining the charge time/power/units that a receiver was/will be provided with Setting the charge times/power for client receivers Obtaining receiver's identification and/or billing information for receiver payment Obtaining receiver authentication key, which may be used for billing Approving receiver's key, for example, for billing purposes Obtaining data from transmitter control unit regarding wireless charging provided, and/or arranging for payment from receiver(s) accordingly Transferring data to a receiver Obtaining data from a receiver Furthermore, some of the above listed operations may compromise the safety of the device, should they be used maliciously or unsuitably. Therefore, execution of such commands by the transmitter control unit may require an authentication system, which may differ from the encryption and/or authentication system used to protect the above mentioned privacy communication. This authentication system should be established and used before the operation. The transmitter control unit may alternately or additionally verify the integrity of the files received, optionally with a third party. Additionally, the laser may be instructed to emit a beam below a predetermined safe power level, or a zero power level. Such potentially safety-related operations, which the current system performs before executing, may include any of the following operations:

Remote/local firmware updates

Remote/local software updates

Setting the type of supported receivers—an operation requiring authentication, but may not require turning the laser off Setting the number of supported receivers an operation requiring authentication, but may not require turning the laser off Obtaining/Setting the search pattern and strategy an operation requiring authentication, but may not require turning the laser off Calibrating the system, typically usually by uploading and causing the system to run a file Uploading scripts pertaining to receiver charging Directing the laser at a specific direction an operation requiring authentication, but not requiring turning the laser off Turning the laser on/off Instructing the laser to emit a beam at a specific power/current Using a password/key for an unintended purpose Setting a password/key an operation requiring authentication, but may not require turning the laser off Determining/Setting time an operation requiring authentication, but may not require turning the laser off Information regarding receiver billing information, payment information and/or the time and amount of power transmitted to specific receivers and other billing related data, such as listed below, are also sensitive data. Altering or gaining access to such data should require a secure communication protocol to be used, which may be an additional, separate password/key to authenticate the access of at least some parties in the communication as secure and verified, before and during execution of these operations, since such operations may have economic value to some users of the systems or to others. For example, banking passwords, account numbers and payment data may be communicated using the API, therefore these should be encrypted. Such operations that may involve private payment information include any of:

Performing remote software updates

Performing remote firmware updates

Obtaining/Setting the search pattern and strategy

Uploading charge scripts

Instructing the system to shutdown

Scheduling an operation

Prioritizing clients

Setting client priority logic (FIFO, LIFO, round robin, based on charge state, based on ID, etc. . . . )

Obtaining receiver's identification and billing information for receiver payment Obtaining receiver authentication key for billing Approving receiver's key for billing Obtaining data from transmitter control unit regarding wireless charging provided, and arranging for payment from receiver(s) accordingly Transmitting payment details of receiver devices, and/or transmitter devices, such as:

Passwords

Bank details

Payment service details

Setting information regarding the wireless charging system payment address, such as who the receiver devices should pay Obtaining/Setting time and time calibration of the transmitter and/or transmitter control unit Obtaining the total charge time/power/units, typically used for quota or billing Setting the charge time/power/units for client receivers Obtaining receiver's Key (for billing)

Approving receiver's key (for billing)

Transferring data to receiver

Obtaining data from receiver

The transmitters referred to in this disclosure may refer to any wireless charging unit adapted to supply wireless power to receiver devices. The transmitter control units referred to in this disclosure are to be understood as controllers adapted to control the wireless power supply, and may either be within the transmitter device, or external to the transmitter device and in communication with it.

There is therefore provided in accordance with an exemplary implementation of the systems provided in the present disclosure, a system for distributing power from a transmitter to at least one receiver, the transmitter comprising:

(i) a laser adapted to emit a beam into a field of view;

(ii) a beam deflection unit capable of deflecting the laser beam into at least one direction in the field of view;

(iii) a control unit, configured to control the power of the laser beam and to control the direction of deflection of the laser beam by the beam deflection unit; and (iv) at least one communication port, connected to the control unit, for at least one of receiving and transmitting data;

and the at least one receiver comprising a photovoltaic cell adapted to convert the laser beam into electrical power, wherein, (A) when there is an indication of at least one of:

the presence of a hardware key associated with the transmitter, or a numeric key received through a communication channel;

and (B) when at least one instruction is received at the port, the at least one instruction comprising at least one of the following commands:

modify a configuration file of the system, modify a software code in the system, modify a firmware code in the system, and send any of the following data through the communication port:

(a) an image of the vicinity of the transmitter, (b) an image of the vicinity of the at least one receiver, or (c) identification of the at least one receiver, the control unit is configured to execute the at least one instruction. In such a system, use of either or both of the hardware key and the numeric key should ensure at least one of the integrity or confidentiality of the data.

The wireless power supply system may be further adapted to (i) generate an image of the field of view of the transmitter and (ii) identify receivers in the field of view of the transmitter, using either the laser to scan the field of view, or a scanning device, for identification of the direction of receiver devices. The above mentioned data may thus comprise at least one of (i) the image of the field of view, or (ii) data determined from the identification.

Such a system may further include a check to ensure that the modification of any of the configuration files, software code and firmware code, is only performed if the laser is off or emitting a beam below a predetermined power level. In such an implementation, the numeric key may be obtained through a signature of the configuration file, software code or firmware code. Furthermore, the transmitter control unit may be adapted to verify the signature, prior to emitting the laser beam.

After the modification of the configuration file, the control unit may be adapted to perform a safety check of at least one configuration parameter of the system, and if the at least one configuration parameter is outside predetermined criteria, wireless power supply to the receiver device should not be resumed. The above mentioned configuration files may comprise any of (i) software updates, (ii) firmware updates, (iii) updates regarding the calibration parameters of the beam emitter or of a power meter in the receiver.

Additionally or alternatively, the transmitter control unit may be adapted to verify the signature prior to and/or after modifying a configuration file, software code, or firmware code in the system.

In any of the above implementations, the data may further comprise at least one of:

(i) billing information, (ii) information regarding charging time of the at least one receiver, (iii) information regarding charging power of the at least one receiver, or (iv) payment details of the at least one receiver.

The above mentioned communication port may be either wired or wireless. The hardware key may be adapted to create a communication channel, such that in the absence of use of the key, some or all devices external or remote to the transmitter, transmitter control unit or wireless charging system are physically isolated from the communication port.

The above mentioned numeric key may be used to encrypt the data. Alternatively, or additionally, the numeric key may be an authentication code. The authentication code may comprise at least one of alphabetic characters, numbers, symbols and electronic signals.

Alternative implementations involve a method of supplying wireless power from a transmitter device to at least one receiver, the method comprising:

(a) performing a scan of the vicinity of the transmitter device, to generate an image of the vicinity, (b) identifying the location of at least one receiver within the vicinity, (c) supplying the at least one identified receiver with energy, and (d) ensuring the integrity of the system by requiring the transmitter device to execute sensitive instructions received from a device external to the transmitter, following at least one of:

the insertion of a hardware key into the system, such that a communication channel is enabled, or an indication of a digital authentication key, wherein the sensitive instructions comprise:

(i) modification of at least one digital file of the transmitter device, (ii) transmission over a communication port associated with the transmitter device at least one of:

(a) the image of the vicinity, (b) information regarding the at least one identified receiver, or (c) information regarding the energy supplied to the at least one identified receiver device.

In such a method, the digital authentication key may be indicated through a signature of the configuration file, software code or firmware code. In such a case, the signature may be verified (i) prior to emitting the laser beam or (ii) before updating the configuration file, software code, or firmware code. Furthermore, in any such method, the digital authentication key may be used to encrypt the data. Additionally, the digital authentication key may comprise at least one of alphabetic characters, numbers, symbols and electronic signals.

According to yet another implementation of the wireless charging systems of the present disclosure, there is presented such a system for distributing power from a transmitter to at least one receiver, the transmitter comprising:

(i) a laser adapted to emit a beam into a field of view, (ii) a beam deflection unit capable of deflecting the laser beam into at least one direction in the field of view, and (iii) a control unit, configured to control the power of the laser beam and to control the direction of deflection of the laser beam by the beam deflection unit, and the at least one receiver comprising a photovoltaic cell adapted to convert the laser beam into electrical power, wherein the wireless charging system further comprises:

(iv) a hardware key configured for insertion into the wireless charging system, the insertion adapted to enable at least one of:

(a) execution of at least one instruction received at the control unit, from a device external to the control unit, and (b) a connection between the at least one device external to the transmitter and the control unit.

In such a system, the at least one instruction may comprise at least one of the commands to:

(i) modify a configuration file of the system (ii) modify a software code in the system (iii) modify a firmware code in the system (iv) send any of the following data through the communication port:

(a) an image of the vicinity of the transmitter, (b) an image of the vicinity of the at least one receiver, or (c) identification of the at least one receiver.

Additionally, the connection may enable the control unit to execute at least one of the commands to:

(i) modify a configuration file of the system (ii) modify a software code in the system (iii) modify a firmware code in the system (iv) send any of the following data through the communication port:

(a) an image of the vicinity of the transmitter, (b) an image of the vicinity of the at least one receiver, or (c) identification of the at least one receiver.

In either of the previously described systems, the modification of configuration files, software code and firmware code may be performed only if the laser is off or emitting a beam below a predetermined power level. Furthermore, the data may also comprise at least one of billing information, information regarding charging time of the at least one receiver, information regarding charging power of the at least one receiver and payment details of the at least one receiver.

In any of the above described systems, the hardware key may create a communication channel, such that in the absence of use of the key, the transmitter is physically isolated and does not receive the instructions.

Additionally, the wireless power supply system may be adapted to (i) generate an image of the field of view of the transmitter and (ii) identify receivers in the field of view of the transmitter, using either the laser to scan the field of view, or a scanning device, for identification of the direction of receiver devices. In such a system, the data may comprise at least one of (i) the image of the field of view, or (ii) data determined from the identification.

BRIEF DESCRIPTION OF THE DRAWINGS

The present invention will be understood and appreciated more fully from the following detailed description, taken in conjunction with the drawings in which.

DETAILED DESCRIPTION

Figure 1:
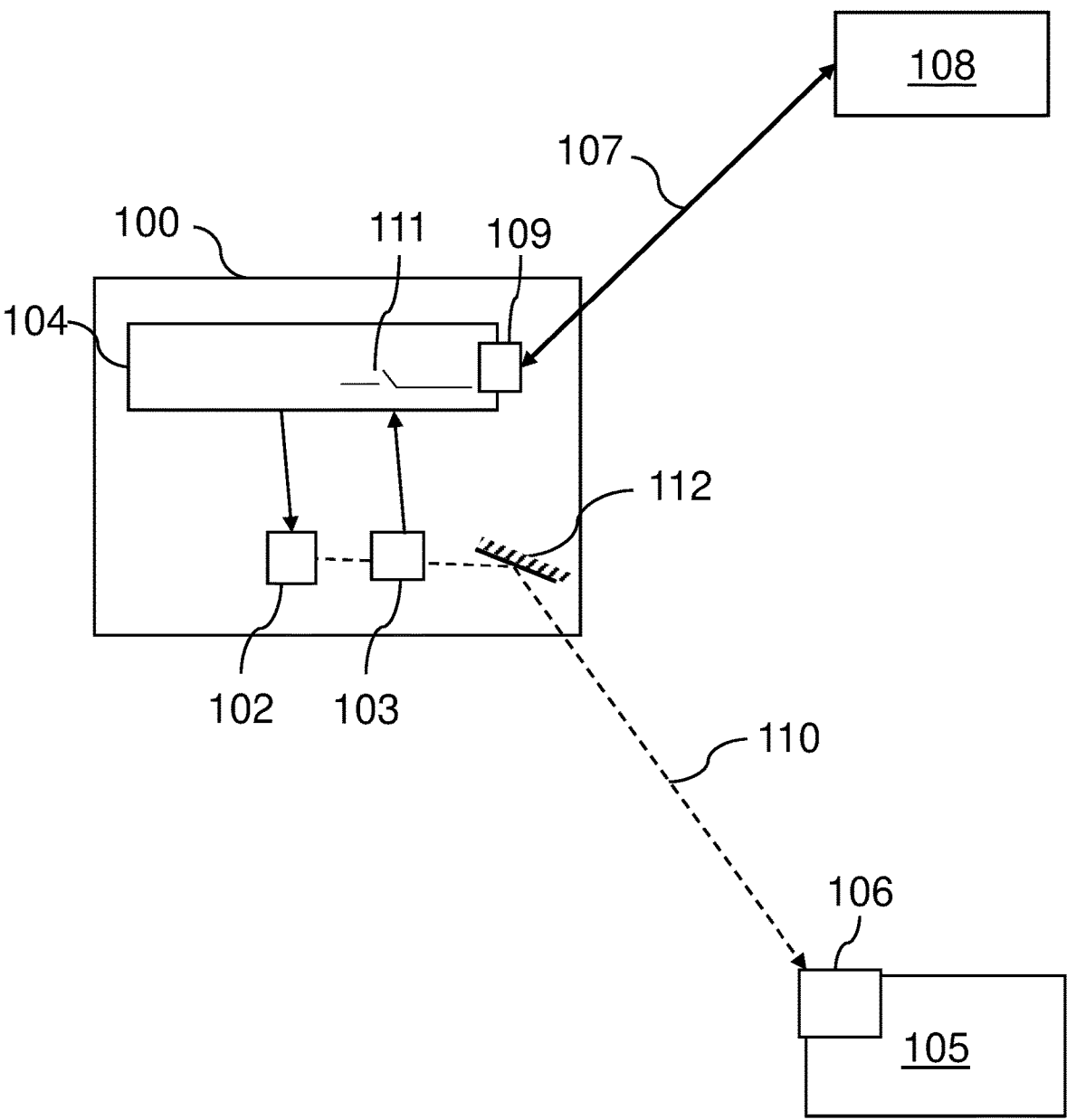
FIG. 1 shows a schematic wireless power supply system in which a transmitter is in communication with an external device. The communication is secured by using a key adapted to close a circuit within the control unit of the transmitter.

Reference is now made to FIG. 1, which illustrates a typical arrangement of a wireless power supply system. A transmitter 100 is shown, comprising a beam generator 102, for example a laser. A scanning mirror 112, or another beam steering apparatus, is used to direct the optical beam 110 generated by beam generator 102 into the vicinity of the transmitter, for instance towards a receiver 105. In order to measure the power level of the laser beam emitted by the transmitter, the system may comprise a power meter 103, called the transmission power meter. The transmitter power meter 103 may be situated inside the transmitter 100, or in the beam path at the exit of the transmitter.

The system also includes a transmitter control unit 104. The control unit 104 may be able to receive signals from the transmission power meter representing the amount of power of the laser beam exiting the transmitter 100. Furthermore, the transmitter control unit 104 may control the power level of the beam emitted by laser 102, as well as the orientation of the scanning mirror 112, used to direct the beam into different directions. The transmitter control unit may be able to affect other parameters of the wireless power supply system, such as radiance of the beam emitted by the laser.

Typically, the receiver 105 contains a photovoltaic cell 106, which converts the optical energy of the beam into usable electric energy, usually for charging or powering a device associated with the receiver.

The system as shown in FIG. 1 may be able to perform a scan of the vicinity of transmitter 100. An image or representation of the room may be generated in the following way. The transmitter control unit may instruct the laser 102 to emit a low power beam and cause the scanning mirror to steer the beam into different directions. An image, or representation of the room may be generated by detecting the beam returned from the receiver. Additionally or alternatively, a camera or additional scanning system (not shown) may be used to generate a direct image of the vicinity of the transmitter.

Additionally or alternatively, the laser may be instructed to scan the room and when the beam impinges on a receiver, a reflection or active signal informs the transmitter control unit of the direction of the identified receiver.

Once a receiver has been located, the transmitter control unit may instruct the laser to begin wireless charging, as shown by beam 110. At some stage in the wireless charging process, the receiver 105 may supply the transmitter control unit with payment details, or other billing information regarding payment for power received.

Transmitter control unit 104 is able to communicate with at least one external unit or device, as illustrated by external unit 108. Transmitter control unit 104 may comprise a communication port 109, in order to transmit data externally and receive instructions from external devices or systems. The external unit 108 may be a receiver 105, or it may be a server or other system used to control and receive information regarding the wireless supply system.

The wireless charging system may communicate with the external device 108 via an Application Programming Interface, or API. APIs are the communication interface through which external devices can probe, command and reconfigure the system, and the transmitter control unit to respond accordingly and additionally supply external sources with system information, all of the former being on condition that an authentication step has been validated. The API may also be configured to operate with a source that has been authenticated, or with a system in which a hardware key is used to enable the communication, in which case the source may not need to be authenticated. Instructions provided by the external unit, through the API, may be used to update either software/firmware files of the wireless charging units, calibrate a wireless charging unit, and adapt it to specific environments as well as to allow better control of its behavior.

Additional safety systems within the wireless charging system may be used to ensure that the system is operating in a safe way. Checks may be performed to ensure that a satisfactory portion of the beam power is reaching a receiver, and not impinging on unintended objects. For example, the receiver 105 may comprise a power meter (not shown) for determining the amount of beam power it is receiving from the transmitter, and/or send a signal representing the amount of power impinging upon the photovoltaic cell 106 to the transmitter control unit 104. Additionally or alternatively, the laser or other electromagnetic beam emitted by the transmitter may be set at a power level below a level which would pose dangers to human beings or equipment. Should such safety systems be altered by a third party, dangerous, beam-generated damage may occur.

An external device or unit may be able to transmit data relating to the overall operation of the system to the transmitter control unit 104. For example, an external unit 108 may be able to instruct the transmitter control unit to perform any of the following:

Update certain configuration files of the system

Update a software file or code within the system

Update a firmware file or code within the system

Affect a calibration parameter of an element of the system

Run safety checks

Instruct the control unit to send specific data

Direct the beam at certain directions

Instruct the laser to emit a beam at a specific power level

Instruct the laser to terminate the beam

Used inappropriately, certain sensitive commands sent to and carried out by the transmitter control unit may present dangers to humans and objects. For example, the transmitter control unit may be instructed to modify internal modes, which are configured during the manufacturing stages, but are not intended to be accessible to the user during day-today use, for safety reasons. Such sensitive instructions include:

Turning a safety system on/off

Modifying safety systems

Configuring parameters of the system, specifically laser and power meter calibration Software updates The system as presently disclosed, typically verifies the authentication and eligibility of the external unit, and/or has specific criteria for when and how certain commands such as those listed above can be carried out before performing such actions, and typically either turns off the laser or reduces the laser power to below a specified level, or delays the command whilst lasing above a specific level of power, before executing such commands.

Alternatively, commands received whilst the laser is emitting a beam above a certain power level may be ignored or viewed as suspicious. This may be the case in an embodiment wherein the external device which has sent such a command to the transmitter control unit is configured to receive log files of the wireless power system, such that the fact that the external device purportedly instructed the transmitter control unit to modify a system file during lasing, may be viewed as suspicious.

Typically, after performing such tasks, the transmitter control unit also performs a general integrity test before allowing the laser to be turned on again. Furthermore, the transmitter control unit may be configured to send potentially sensitive information comprising any of the following:

information regarding receivers payment details of a receiver or transmitter configuration parameters, for example the power level of the beam emitted by the laser, or information regarding the vicinity of the transmitter, for example an image or a representation of the room generated by a scan performed by the transmitter. This image, or data relating to the resulting image, may be sent to an external unit from the transmitter control unit, via the secure API. An external device receiving such information may be useful for identifying and correcting installation problems and system faults or for other reasons. However, such images and their related information may be or contain sensitive data, and storing it and/or sending it to an external unit may have privacy ramifications, should unintended parties gain access to the image or other sensitive data.

A breach in the confidentiality of the above information may result in compromising the privacy of system users, or data relating to economic functions of the system or the external unit, such as payment data.

Thus, in order to protect the security and confidentiality of the system, in one embodiment of the presently disclosed system, a hardware key or device is used, in order to enable or allow certain communication, or execution of certain instructions. In one example, a hardware key is used in conjunction with a circuit within the transmitter, as shown by switch 111. In such an example, the hardware key would cause switch 111 to be closed. Switch 111 may be a mechanical switch, or an electronic switch implemented on a chip.

In both of the above embodiments, the switch closure is generated by means of a physical act using a hardware device.

When the hardware key is inserted or presented to the wireless power supply system, an instruction may be sent to close the switch, enabling and/or creating a communication channel, thus enabling the execution of certain commands. Alternatively, the hardware key may close the switch directly. Examples of such a hardware key include a specially shaped tool, or even a conventional type of key.

In one embodiment, a hardware key may allow communication without physically creating a communication channel. For example, upon receipt of an instruction at the control unit, the control unit may check to ensure that a key is present or has been presented, before executing instructions or sending information.

Alternatively or additionally, a numeric key may be used in order to protect and secure communication between an authenticated external unit and the transmitter control unit. The numeric key may consist of letters, numbers, or digital representations of electric signals. The numeric key may be a hash or signature of a file.

In one embodiment, should an external unit instruct the transmitter control unit to execute an instruction, or amend or run a file in the system, the transmitter control unit may first check the numeric key, which may be a signature or hash of the received file, with a third party certification server, or with a database of verified signatures or hashes.

Alternatively or additionally, a numeric key may be an authentication code, such as a password or pin. When an instruction or data is received at the transmitter control unit, through communication port 9, the control unit may determine whether the data contains the correct authentication code, and ignore or trigger an alert should specific commands be issued without the presence of the authentication code. The authentication code may be present in the header or body of received data, or may precede the data.

Alternatively or additionally, a numeric key may be used to encrypt and/or decrypt communication sent between the transmitter control unit and an external unit.

Various encryption methods are known in the art, and many of them may be used. Some preferred encryption methods including symmetric key or public/private key encryption methods. HTTPs, as well as other common methods, may be preferred as they may be simpler to implement.

Such encryption methods typically protect the confidentiality of data transmitted, as well as ensuring that a third party issuing commands using an established connection between a control unit and external unit would not be able to issue commands using the correct encryption method.

One implementation of the currently disclosed system is the isolation of specific laser calibration parameters and features. This means that the network that communicates with external units, or the connection over which modification of the system in day-to-day use, is not connected to these sensitive elements. Thus, should a malicious third party gain remote access to the wireless power supply system, no access would be gained to elements which could cause dangerous damage should they be misused, for example, affecting the gain medium of a laser, or changing the modulation characteristics of a beam emitted by the transmitter.

As mentioned above, a hardware key may allow a communication channel with some, or all of these features of the system.

Furthermore, the receiver may further be equipped with a receiver control unit, which collects information on how much of the beam is being received by the receiver, information on the angle of the beam emitted by the transmitter, the power level and wavelength of the beam. The receiver control unit may use a separate API framework, to communicate with an external unit. The external unit may then compare the data indicated by the receiver control unit and transmitter control unit. Should there be a significant difference in the power received by the receiver, from the power which the transmitter control unit is indicating, a breach in the transmitter control unit may have occurred, leading to dangerous or insecure management of the system and data collected by it. This two-factor check increases the integrity of the data received.

The system may use two different channels or different encryption and/or authentication protocols to ensure that even if a vulnerability was present in one of the systems, a log analysis system or team would be able to determine discrepancies between power supplied and power received very quickly.

In one implementation of the currently disclosed systems and methods, a system is disclosed wherein the transmitter control unit only executes sensitive commands sent to it at specific predetermined time intervals, preferably not an exact round number in time, such as, for instance, every 1.275 milliseconds, this being simply a non-limiting example. This means that the timestamp of the point in time when the command was sent by an external source, is checked by the transmitter control unit in order to determine whether it was sent at an allowed specific predetermined time instant.

Additionally, in order to make the communication impenetrable to sniffing by third parties, of packets sent between the two systems, the allowed time intervals could be a dynamic function of a more complicated calculation, such as, for instance, a large prime number calculation, which would be pre-agreed prior to communication.

Some of the secure two-way interaction between a verified external source and a transmitter control unit, supported by the systems and methods of the current disclosure, include a verified external source instructing the transmitter control unit to execute any of the following instructions, all of which are defined as being sensitive instructions:

A firmware update

A software update

Obtaining the software version of either the transmitter or one or more receivers Obtaining the firmware version of either the transmitter or one or more receivers Obtaining the status of the client, namely information regarding receiver devices:

Receiver ID

Charging power

Voltage

Current

Number of clients

Location of receivers

Temperature of components

Temperature of the photovoltaic cell

Obtaining beam direction

Obtaining beam power

Temperature of the laser

Obtaining event logs such as:

a. Firewall logs b. Authentication logs c. Error logs d. Security logs e. Audit logs f. System logs g. Application logs h. DNS server logs i. Temperature logs Obtaining event logs from the network used by the transmitter control unit, such as:

Firewall logs

DNS logs

Router logs

Obtaining telemetries such as temperatures, error codes, state

Set the type(s) of receivers supported for wireless power supply by the transmitter Set the number of receivers supported for wireless power supply by the transmitter Get/Set the search pattern and strategy Calibrate the system, typically by uploading a file to:

Calibrate transmitter power meters

Calibrate receiver power meters, used for safety and to check that an acceptable portion of the beam is reaching the receiver Receive status from devices connected to the receiver, typically, battery status and temperature Upload scripts relating to wireless charging, such as:

The priority level of specific receivers for receiving wireless power supply

At what times different receivers should be supplied with power

The order in which receiver's should be supplied with power

The location of receivers in space, and/or which location have higher priority

Whether priority charging goes to the device with the least amount of stored energy, or priority is given in a different order Instruct the transmitter control unit to direct the laser at a specific direction Set the laser to emit a beam having a specific power/current Scan the room and send data regarding the scan Send an image of the scan Use password/key Set password/key Shutdown Terminate the beam Modify the beam Schedule operation Prioritize clients Set client priority logic (FIFO, LIFO, round robin, based on charge state, based on ID, etc. . . . )

Get total charge time/power/units, typically used for quota or billing

Set charge time/power/units for client

Obtaining receiver's identification and billing information for receiver payment Obtaining receiver authentication key (for billing)

Approve receiver's key (for billing)

Transfer data to receiver

Obtaining data from receiver

Obtaining data from a transmitter control unit regarding wireless charging provided, and arranging for payment from receiver(s) accordingly.

The transmitter control unit may securely provide an external unit with billing and payment related information regarding transmittal of power to different receiver devices, and thus external units such as payment services, may perform transfer of money or debit credit cards, or the like. Furthermore, the transmitter control unit may keep updating an external unit without the external unit first probing the transmitter control unit.

Firmware and software data should be electronically signed, typically by the manufacturer, who assures safety of the code before signing it, and/or by banks or other financial bodies, used by devices to pay for the wireless power received. In such a case the electronic signature may be verified by the system before accepting it, such as by means of secure bootloader/public key-private key verification or encryption, or a secret code used by the system before operation. A hardware key may be used to authenticate any of the above sensitive data. A multi-factor authentication system may be used wherein a hardware key is used in conjunction with a private/public key and/or password, to ensure security and integrity of the system.

Moreover, an analysis of data transmitted from the transmitter control unit may be performed, either in real time or with a delay. This may be carried out by analyzing log files transmitted by the transmitter control unit, in order to determine whether data, or patterns in data, are indicative of behavior representative of a fault in the safety system, a hazardous situation, or a breach in the integrity and security of the transmitter system, or communication system.

Such log files, or data received from the transmitter control unit, may be considered a large data set, known in the art as "big data", that can be analyzed in order to find seemingly random and insignificant changes, yet should these "small" changes be occurring in tandem with other small changes, may be indicative of an event which needs responding to and/or monitoring.

Should a problematic situation be indicated, for example data coming from the transmitter control unit indicating long average acquisition time for receivers, and other small yet cumulatively significant changes occurring in the system, the computer system analyzing the data is able to instruct the transmitter control unit to modify the system parameters, or to adjust operational parameters of the system based on the analysis performed.

Alternatively, the analysis may be performed periodically, or just collected, giving the user a later opportunity to analyze behavior patterns in order to better understand the system, and modify the system accordingly.

Machine learning may be used to help an external source, for example to train a log analysis tool to identify true safety and security alerts, and better ignore false positives.

Using an external computer and/or external server to collect and analyze the transmitter control unit log files and data has several advantages. Firstly, the transmitter control unit may be a very small device, typically located within the wireless power transmitter itself, thus storing such a large amount of information may be impractical. Secondly, the computations needed may be above the excess computing power that may be available to the system, without interfering with the normal operation of the system. Lastly, the analysis of data by a computer may be configured to generate alerts, which would then be viewed and evaluated by a user, who could decide whether a response is required, or the alert could be ignored, allowing automatic shutdown of the transmitter to be kept to a minimum. This may necessitate communication with a device outside of the transmitter control unit.

Figure 2:
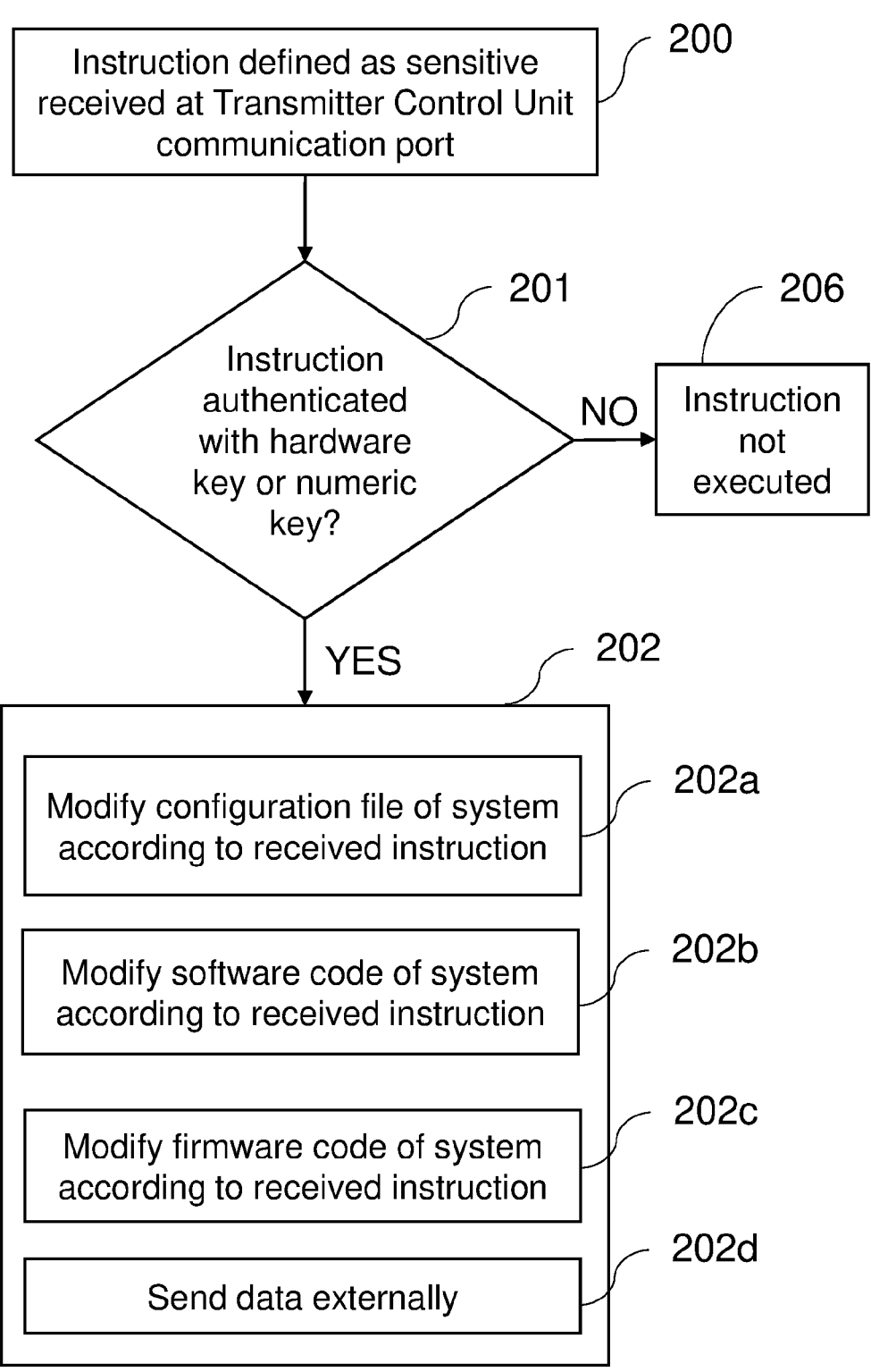
FIG. 2 shows a flow chart illustrating an exemplary response of the system when an instruction is received at the transmitter control unit.

Reference is now made to FIG. 2, which is a flow chart which illustrates one method in which a sensitive command is handled by the currently disclosed systems and methods.

An instruction defined as being a sensitive instruction is received at the communication port of the transmitter control unit, as shown in step 200. The flow chart may only be relevant to certain commands received, and other, non-sensitive commands need not mandate a numeric key or hardware key to enable execution.

In order to protect the integrity and security of the system, the transmitter control unit then checks for a numeric key or hardware key, as is shown in step 201. Some examples of numeric and hardware keys have been mentioned hereinabove. As explained in the description of FIG. 1 above, a hardware key may cause a switch to be closed, and thus enable the flow of electrons through a circuit, thus the fact that the command is carried out by the system implies the authenticity of the command, since the fact that a hardware key has been presented ensures that the command is verified by the system.

If in step 201 the message is found not to be authenticated, in step 206 the instruction is not executed, due to the received instruction not containing the correct numeric key, or a hardware key not having been presented. Additionally, a security alert may be generated, to warn the user that an unauthenticated attempt has been made to break into the system.

However, if the instruction received is shown to comprise the numeric code, or if a hardware key enables the system to execute the received command, then the transmitter control unit proceeds to step 202, where it carries out the instruction received.

As mentioned hereinabove, the instruction may be to modify a configuration file of the system, as shown in 202a, a software code of the system, as shown in 202b, a firmware code of the system, as shown in 202c, or an instruction for the transmitter control unit to send data externally, as is shown in 202d.

Figure 3:
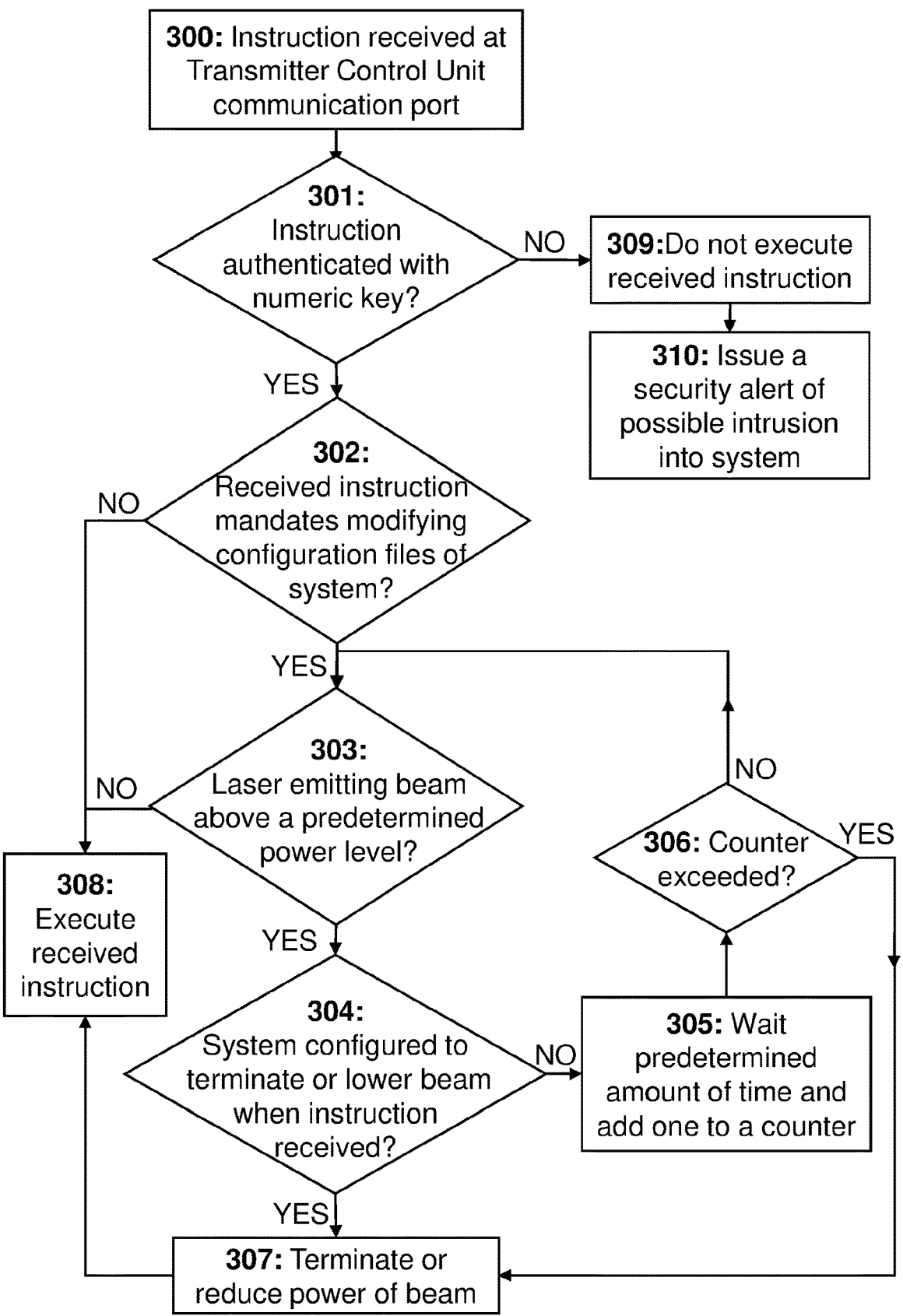
FIG. 3 shows a flow chart which describes one embodiment in which an instruction received at the transmitter control unit from an external device is executed when a authentication key is presented, and a check is performed to ensure that the transmitter is not emitting a high-power beam before configuration files are updated.

Reference is now made to FIG. 3, which is a flow chart which illustrates one embodiment of the currently disclosed methods.

An instruction defined as being a sensitive instruction is received at the communication port of the transmitter control unit, as shown in step 300. The flow chart may only be relevant to certain commands received, and other, non-sensitive commands need not mandate a numeric key.

In order to protect the integrity and security of the system, the transmitter control unit checks for a numeric key, as is shown in step 301. Some examples of numeric keys have been mentioned hereinabove.

If in step 301 the message is found not to be authenticated by the key, in step 309 the instruction is not executed, since the received instruction does not contain the correct numeric key. Additionally, a security alert may be generated, as is shown in step 310, to warn the user that an unauthenticated attempt has been made to break into the system.

However, if the instruction received is shown to comprise the numeric code, then the transmitter control unit proceeds to step 302, where it determines whether the instruction comprises modifying certain system files of the system, such as a configuration file, software code, firmware code or other calibration or laser modulation file.

If the instruction is deemed not to comprise instructions to modify certain system files, then the transmitter control unit proceeds to step 308, where it attempts to carry out the instruction.

Otherwise, since the update of certain files whilst the laser is emitting a high-powered beam could have unintended, and even dangerous consequences, the transmitter control unit proceeds to step 303, where the laser beam power is checked to determine if it is above a predetermined level.

As shown in step 308, should the laser be emitting a beam below a predetermined level, the system attempts to carry out the received instruction.

However, if the laser is emitting a beam above a predetermined level, then, depending on the system configuration, then in step 304, depending on the control design, the transmitter control unit either terminates the beam or brings it to below a predetermined power level as shown in step 307, or alternatively, delays action for a predetermined amount of time as determined in step 305.

In one implementation, a counter is used in step 305. The transmitter control unit is set to return to step 303 a predetermined number of times. Should the counter reach its maximum level, as determined in step 306, then, in step 307 the transmitter control unit directly instructs the laser to reduce its power, and in step 308 executes the received instruction.

In an alternative embodiment, the system first terminates the beam before determining whether the received message comprises the numeric key, as opposed to first determining whether the message is authenticated, as is shown in FIG. 3.

Alternatively or additionally, a hardware key may be used in the place of, or in conjunction with, a numeric key, this alternative not being shown in FIG. 3.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A system for distributing power from a transmitter to at least one receiver, the transmitter comprising:
   a laser adapted to emit a beam;
   a beam deflection unit adapted to scan the beam in a vicinity of the transmitter in order to identify at least one receiver;
   a transmitter control unit, configured to control the power of the laser beam and to control the direction of deflection of the laser beam by the beam deflection unit; and
   at least one communication port, providing connection to an external control unit, for at least one of receiving and transmitting data;
   wherein the at least one receiver comprises a photovoltaic cell adapted to convert the laser beam into electrical power,
   and wherein, access is gained to at least one instruction comprising at least one of the following commands:
      (i) modify a configuration file of the system;
      (ii) modify a software code in the system;
      (iii) modify a firmware code in the system; and
      (iv) send any of the following data through the communication port between the transmitter and the external control unit:
         (a) an image of the vicinity of the transmitter;
         (b) an image of the vicinity of the at least one receiver; or
         (c) identification of the at least one receiver,
the access being gained via the at least one communication port, after the transmitter control unit verifies that there is an indication of at least one of:
   the presence of a hardware key associated with the transmitter, or
a numeric key received through the at least one communication port.

2. The system according to claim 1 wherein the modification of configuration files, software code or firmware code are performed after causing the laser to turn off or to emit a beam below a predetermined power level.

3. The system according to claim 2 wherein the numeric key is obtained through a signature of the configuration file, software code or firmware code.

4. The system according to claim 3, wherein the transmitter control unit is adapted to verify the signature, either prior to emitting the laser beam, or prior to modifying a configuration file, software code, or firmware code in the system.

5. The system according to claim 3 wherein the transmitter control unit is adapted to verify the signature of the configuration file after modifying a configuration file, software code, or firmware code in the system.

6. The system according to claim 1, wherein the data further comprises at least one of billing information, information regarding charging time of the at least one receiver, information regarding charging power of the at least one receiver and payment details of the at least one receiver.

7. The system according to claim 1, wherein the hardware key creates a communication channel, such that in the absence of use of the key, the data is physically isolated from the communication port.

8. The system according to claim 1, wherein the configuration files comprise any of (i) software updates, (ii) firmware updates, (iii) updates regarding the calibration parameters of the beam emitter or of a power meter in the receiver.

9. The system according to claim 1, wherein the wireless power supply system is adapted to (i) generate an image of the field of view of the transmitter and (ii) identify receivers in the field of view of the transmitter, using either the laser to scan the field of view, or a scanning device, for identification of the direction of receiver devices.

10. The system according to claim 1, wherein the data comprises at least one of (i) the image of the field of view, or (ii) data determined from the identification.

11. The system according to claim 1, wherein after the modification of the configuration file, the control unit is adapted to perform a safety check of at least one configuration parameter of the system, and if the at least one configuration parameter is outside predetermined criteria, wireless power supply to the receiver device is not resumed.

12. The system according to claim 1, wherein the numeric key is an authentication code.

13. A method for supplying wireless power from a transmitter device to at least one receiver, the method comprising:
   (a) performing a scan of the vicinity of the transmitter device, to generate an image of the vicinity;
   (b) identifying the location of at least one receiver within the vicinity;
   (c) supplying the at least one identified receiver with energy; and
   (d) ensuring the integrity of the system by requiring a transmitter control unit to execute sensitive instructions received from a control device external to the transmitter, following at least one of:
      the connecting or presenting of a hardware key to the system, such that a communication channel is enabled; or
      an indication of a digital authentication key,
   wherein the sensitive instructions comprise at least one of the following commands:
      (i) modification of at least one digital file of the transmitter device; and
      (ii) transmission over a communication port connecting the transmitter device with the external device, at least one of:
         (a) the image of the vicinity,
         (b) information regarding the at least one identified receiver, or
         (c) information regarding the energy supplied to the at least one identified receiver device.

14. A wireless charging system for distributing power from a transmitter to at least one receiver, the transmitter comprising:
   a laser adapted to emit a beam into a field of view;
   a beam deflection unit capable of deflecting the laser beam into at least one direction in the field of view; and
   a control unit, configured to control the power of the laser beam and to control the direction of deflection of the laser beam by the beam deflection unit; and
wherein the at least one receiver comprises a photovoltaic cell adapted to convert the laser beam into electrical power, and
wherein the wireless charging system further comprises:
   a hardware key configured to be connected or presented to the wireless charging system, the hardware key adapted to enable at least one of:
      (a) execution of at least one instruction received at the control unit, from a device external to the control unit; and
      (b) a connection between the at least one device external to the transmitter and the control unit; and wherein if the system is not presented with said hardware or digital key, then the system is precluded from (a) executing received instructions and (b) connecting with said device external to the control unit.

15. A system according to claim 14 wherein the at least one instruction comprises a command to modify a software code in the system.

16. A system according to claim 14 wherein the at least one instruction comprises a command to send an image of the vicinity of the transmitter, through the communication port.

17. The system according to claim 14 wherein the at least one instruction comprises at least one of the commands to:

(i) modify a configuration file of the system (ii) modify a software code in the system (iii) modify a firmware code in the system (iv) send any of the following data through the communication port:

(a) an image of the vicinity of the transmitter;

(b) an image of the vicinity of the at least one receiver; or (c) identification of the at least one receiver.

18. The system according to claim 14 wherein the connection enables the control unit to execute at least one of the commands to:

(i) modify a configuration file of the system (ii) modify a software code in the system (iii) modify a firmware code in the system (iv) send any of the following data through the communication port:

(a) an image of the vicinity of the transmitter;

(b) an image of the vicinity of the at least one receiver; or (c) identification of the at least one receiver.

19. The system according to claim 17, wherein the modification of configuration files, software code and firmware code are performed after the laser is turned off or configured to emit a beam below a predetermined power level.

20. The system according to claim 17, wherein the data further comprises at least one of billing information, information regarding charging time of the at least one receiver, information regarding charging power of the at least one receiver and payment details of the at least one receiver.

21. The system according to claim 14, wherein the hardware key creates a communication channel, such that in the absence of use of the key, the transmitter is physically isolated and does not receive the instructions.

22. The system according to claim 14, wherein the wireless power supply system is adapted to (i) generate an image of the field of view of the transmitter and (ii) identify receivers in the field of view of the transmitter, using either the laser to scan the field of view, or a scanning device, for identification of the direction of receiver devices.

23. The system according to claim 22, wherein the data comprises at least one of (i) the image of the field of view, or (ii) data determined from the identification.

* * * * *